No. 695,111. Patented Mar. 11, 1902.
P. H. McDERMOTT.
CONTROLLER FOR GAS BURNERS.
(Application filed Apr. 26, 1901.)
(No Model.)
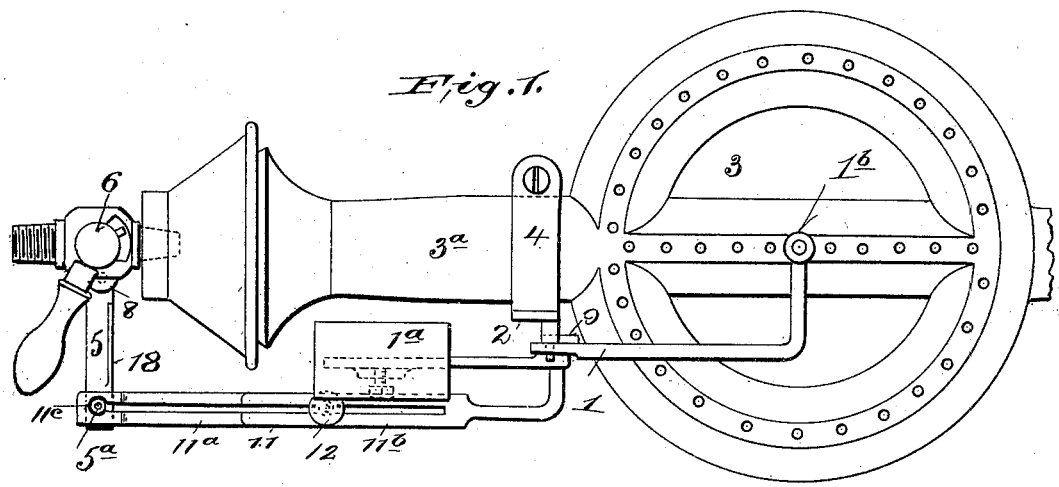
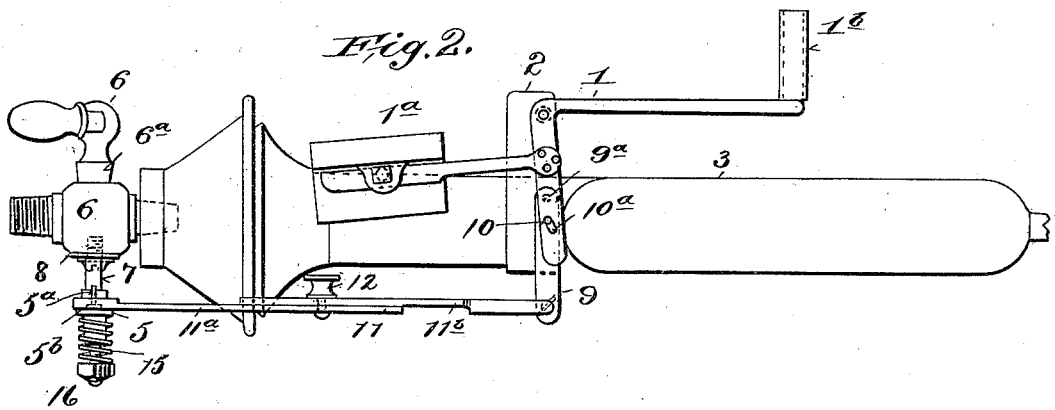
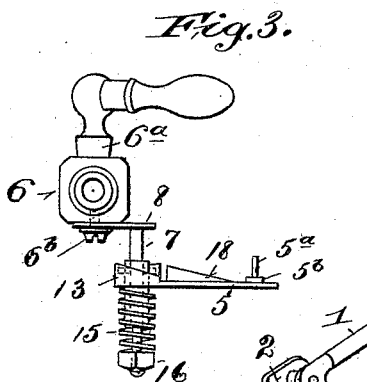
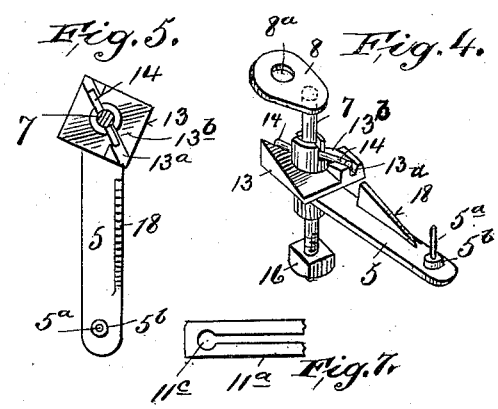
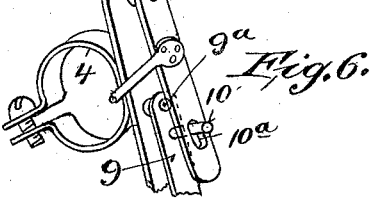
Witnesses:
C. W. Benjamin
M. Manning
Inventor:
P. H. McDermott
by T. F. Bourne,
his atty
THE NORRIS PETERS CO., PHOTO-LITHO., WASHINGTON, D. C.

UNITED STATES PATENT OFFICE.

PHILIP H. McDERMOTT, OF NEW YORK, N. Y.

CONTROLLER FOR GAS-BURNERS.

SPECIFICATION forming part of Letters Patent No. 695,111, dated March 11, 1902.

Application filed April 26, 1901. Serial No. 57,527. (No model.)

*To all whom it may concern:*

Be it known that I, PHILIP H. MCDERMOTT, a citizen of the United States, and a resident of New York city, borough of Manhattan, State of New York, have invented certain new and useful Improvements in Controllers for Gas-Burners, of which the following is a specification.

My invention has relation to gas-burners used with heating appliances, such as cooking-stoves, and has for its object to provide means adapted to be attached to various styles of burners and arranged to reduce the flow of gas to the burner when a utensil is removed from above.

The invention consists in the novel details of improvement that will be more fully hereinafter set forth and then pointed out in the claims.

Reference is to be had to the accompanying drawings, forming part hereof, wherein—

Figure 1 is a plan view of a burner provided with my improvements. Fig. 2 is a side view thereof. Fig. 3 is a detail view of the cock and the arm connected therewith. Fig. 4 is a perspective view of the arm and devices to be connected with the cock. Fig. 5 is a plan view thereof, partly in section. Fig. 6 is a perspective view illustrating the lever and the means for attaching the same to the gas-burner, and Fig. 7 is a detail view of the under side of part of the link 11.

In the accompanying drawings similar numerals of reference indicate corresponding parts in the several views.

In the drawings the numeral 1 indicates a lever, which is shown in the form of a bell-crank, pivotally connected with a support 2, which may be provided with suitable means for attaching it in connection with a gas-burner 3. I have shown the support provided with a clamp 4, adapted to be attached to the pipe $3^a$ of the burner, although the support 2 may be attached to any other suitable fixture.

$1^a$ is a weight connected with lever 1, and the latter is provided with an extension $1^b$.

The parts are to be adjusted in connection with the burner in such manner that the extension $1^b$ will be in position over the burner to be engaged by a utensil when the latter is placed in position on a stove or the like above the burner, the utensil thereby swinging the lever 1 on its pivot.

The lever 1 is connected with an arm 5, that is adapted to be attached to the key or stem $6^a$ of a stop-cock 6 of the gas-supply pipe. The arm 5 is movably connected with a stem 7, shown provided with a crank or extension 8, that has an opening $8^a$, whereby it may be secured to the key $6^a$ by the screw $6^b$, and can thus be adjusted to the proper position. The arm 5 is joined to the lever 1 by suitable interposed connections, and in order to give the arm the requisite movement for operating the cock while the lever 1 has a relatively limited movement I have shown a swinging arm 9, pivotally connected with the support 2, as at $9^a$, and also connected with the depending portion of the lever 1, as by a pin 10 working in a slot $10^a$. As the pin 10 is near pivot $9^a$, it will be seen that the lower end of arm 9 will be given a greater throw than the depending portion of arm 1.

11 is a link interposed between the parts 5 and 9 for operating the former by the lever 1, and in order to provide for adjustment of my improvement to burners of various dimensions I preferably make the link 11 extensible. For this purpose I have shown the link as composed of two members $11^a$ $11^b$, provided with slots adapted to aline, and 12 is a clamping bolt and nut adapted to pass into said slots and to lock the parts $11^a$ $11^b$ together, so as to provide for the necessary extension of the link 11. The connection of the link 11 with the arm 5 is intended to be such that the lever 1 will move arm 5 sufficiently far to fully open the cock from a partially-open position, and when full closure of the cock is desired the arm 5 can move independent of the link 11. For this purpose I have shown a pin $5^a$ extending from the arm 5 and passing through the slot in the extension 11, and $5^b$ is an enlargement or head at the base of the pin $5^a$, adapted to receive a socket $11^c$ in the part $11^a$, the socket communicating with the slot therein, the head $5^b$ and said socket serving to operatively connect the arm 5 with the link 11. The relative arrangement of the parts is intended to be such that when they are in the position shown in Figs. 1 and 2 the cock will be partly open, and when the utensil depresses the lever 1 the arm 5 will be swung to fully open the cock, as toward the left in Fig. 1. When the utensil is removed, the parts will resume the position shown in Fig. 1. The weight 1$^a$ tends to maintain the cock partly open, causing the depending portion of lever 1 to engage burner 3 as an abutment, Fig. 2. Provision is also made for permitting the cock to be fully closed either when the utensil is upon the lever 1 or otherwise. For this purpose I have provided a movable connection between the arm 5 and the stem 7, as well as means for moving the head 5$^b$ out of the socket 11$^c$ when the link 11 nearly reaches the end of its operative stroke in opening the cock. For these purposes I provide the arm 5 with a head 13, that is swiveled on the stem 7 and has one or more sockets 13$^a$, adapted to receive a pin or the like 14, secured to the stem 7, (see Figs. 4 and 5,) a spring 15 upon said stem serving to normally hold the head 13 in engagement with the pin 14, the spring being interposed between said head and a nut or the like 16 upon the stem 7. To permit freedom of movement between the parts 13 and 14, the head adjacent to the socket 13$^a$ is suitably beveled, as at 13$^b$, to permit the pin to ride into and from the socket. When the parts are in the normal position shown in Fig. 2, the lever 1 being stopped by the burner 3 or other suitable abutment, the stem 6$^a$ can be fully turned to shut off the flow of gas, as the head 5$^b$ and socket 11$^c$ of link 11 serve to hold the arm 5 from independent movement toward burner 3, and thus as the stem 6$^a$ is so turned the pin 14 will pass out of the socket 13$^a$. When the cock is next turned fully on, the pin and socket will be again brought into engagement to connect the arm 5 rigidly with the stem 7.

In order to release the link 11 from the arm 5 at the time that the cock is fully opened by the placing of the utensil upon the lever 1, so as to enable the cock to be fully turned off while the utensil is upon said lever, I provide means for releasing the connection of the arm 5 with the link 11 by the action of the latter in opening the cock. For this purpose I have provided a cam or inclined surface 18 upon the arm 5, which lies in such position that as the arm 5 continues fully to the left in Fig. 1 said cam or incline will pass under the link 11 and lift it to release the head 5$^b$ from the socket 11$^c$, leaving the cock free and disconnected from the lever 1. However, when the cock is next shut off and the lever 1 released the socket 11$^c$ and the head 5$^b$ will again engage.

From the foregoing description it will be understood that my improvements are adapted to be applied to burners and their fittings of various styles and dimensions, so as to project the lever 1 into line with a utensil and connect said lever with the cock, and by this means it is not necessary to build the gas-controlling devices in with the burner for any particular stove or heating appliance. When the cock is shut off, the parts 5 and 7 are disconnected from their operative relation, as before explained, and if a utensil is now placed over the burner the cock will not open because of the disconnection of parts 13 and 14. If the cock is opened before a utensil is placed upon the arm 1, the pin 5$^a$ will draw the link 11 until the horizontal portion of arm 1 engages the burner 3, whereupon movement of link 11 to the left will be arrested and the continued movement of the cock and arm 5 will cause the engagement of head 13 with pin 14. When the utensil is now placed upon the lever 1, the cock will remain open. When the utensil is removed, the weight 1$^a$ will restore the parts to the position shown in Fig. 2, whereby the link 11 will cause arm 5 to return the cock to the partially-open position indicated. A low flame can be thus maintained during such times as the cock has not been fully shut off and while the utensils are removed from over the burner.

I do not limit my invention to the various details of construction, as they may be varied without departing from the spirit thereof.

Having now described my invention, what I claim is—

1. In a device of the character described, the combination of a lever having a portion adapted to overlie a burner, means for attaching the same in connection therewith, an arm for attachment to a stem of a cock, means for connecting said arm and lever, and means for permitting independent movement between the arm and said stem, substantially as described.

2. The combination of a lever having a portion adapted to extend over a burner, means for attaching the same in connection with the burner, a stem provided with means for attachment to the key of a cock, an arm associated with said stem, and a link between said arm and lever provided with means for movably connecting it with the arm to permit the cock to have movement independently of the lever, substantially as described.

3. The combination of a lever having a portion adapted to extend over a burner, means for attaching the lever in connection therewith, an arm, means for connecting it with the key of a cock, an extensible connection between said lever and arm, and means for permitting the key of the cock to have movement independent of said devices, substantially as described.

4. The combination of a lever having a portion adapted to extend over a burner, means for attaching the same in connection therewith, a stem connected with the key of a cock, an arm swiveled on said stem, a clutch for adjustably holding said arm and stem, a connection between said lever and arm, and means to permit the stem of the cock to have movement independent of said arm, substantially as described.

5. The combination of a lever having a portion adapted to extend over a burner, means for attaching the lever in connection with the burner, a stem to be connected with the key of a cock, an arm swiveled on said stem and having a head, a pin-and-socket connection between said arm and head, a link between said lever and arm, and a pin-and-slot connection between the arm and link for permitting said parts to have independent movement, substantially as described.

6. The combination of a lever having a portion adapted to extend over a burner, means for attaching the lever in connection with the burner, a stem to be connected with the key of a cock, an arm connected with said stem and provided with a pin and a head, a link between said lever and arm provided with a slot and a socket, and means for releasing the head from said socket by the movement of the link and arm, substantially as described.

7. The combination of a lever having a portion adapted to extend over a burner, means for attaching the lever in connection with the burner, a stem to be connected with the key of a cock, an arm connected with said stem and provided with a pin and a head, a link between said lever and arm provided with a slot and a socket receiving said pin and head, and an inclined surface adapted to release said head and socket to permit the arm to have movement independent of the link, substantially as described.

8. The combination of a lever having a portion adapted to extend over a burner, a support for the lever, an arm pivotally connected with said support and also pivotally connected with said lever, an arm adapted to be connected to the key of a cock, a link between said arms, and means for permitting movement of the second-mentioned arm independent of said link, substantially as described.

PHILIP H. McDERMOTT.

Witnesses:
T. F. BOURNE,
M. MANNING.